Aug. 18, 1964     E. J. CATOR     3,145,065

BEARING ASSEMBLY

Filed Dec. 26, 1961

*INVENTOR.*
EDWARD J. CATOR
BY Frank C. Parker
David E. Dougherty
ATTORNEYS

3,145,065
BEARING ASSEMBLY
Edward J. Cator, Penfield, N.Y., assignor to Bausch & Lomb Incorporated, Rochester, N.Y., a corporation of New York
Filed Dec. 26, 1961, Ser. No. 162,029
3 Claims. (Cl. 308—6)

This invention relates to a novel bearing assembly and more particularly to a novel rectilinear bearing assembly having an improved race.

In optical instruments such as measuring instruments, it is highly desirable to have a slide adapted for rectilinear movement. In such instruments it is often essential to maintain precision alignment during movement of the slide. Rectilinear bearing assemblies of this type are manufactured to precision accuracy and due to the relatively close tolerances are difficult and expensive to manufacture. Often the precision accuracy is lost due to a small amount of wear caused by grit or other foreign matter falling into the assembly.

Precision rectilinear bearing assemblies also known as Franke bearings include a slide member and a housing. Two sets of precision ball bearings position and support the slide within the housing. Conventional bearings also include precision balls and longitudinally extending steel rods. The balls are disposed between the rods and reciprocably support the slide within the housing. The balls are in rolling contact with the rods and in effect have point contact with the rods.

The rods form a race or trackway for the bearings; and, according to conventional practice are made of relatively hard steel. The point contact between the ball and rods results in relatively large pressures exerted on the balls and rods. Accordingly, the wear in an assembly of this type is relatively large and the durability is poor. In such devices flaking of the ball or rod results in an intolerable loss in accuracy. Damage to the balls or rods also destroys the smooth movement of the device.

According to the present invention, the conventional rods in a rectilinear bearing are replaced by tubular members having a relatively large modulus of elasticity and a relatively high yield point. The tubular members compensate to a high degree for relatively loose tolerances in the ball assembly. For example, if several balls in the race are in a position wherein their major diameter is greatest, the tubular members are sufficiently resilient to compensate for this condition. In conventional systems when this condition occurs there is a resultant high wear and rough movement rather than the smooth chatter free movement necessary in such instruments.

Similarly, the assembly may be pre-loaded in order to obtain a degree of surface contact between the ball and tubular member. The surface contact results from the ball being forced slightly inwardly into the tubular member which substantially reduces the pressure obtained with a solid rod. This feature facilitates lubricating conditions as well as producing an exceptionally smooth movement.

Other approaches to solving this problem include a materials approach. Such an approach might suggest the use of an alloy such as brass to replace the hard stainless steel rod of conventional slides. It is rather difficult to find a material having a relatively high modulus of elasticity and a relatively high yield point. Generally, approaches along this line are a compromise and utilize materials having a relatively low yield point and a relatively low modulus of elasticity. Such materials wear relatively fast and do not readily return to an original configuration.

Advantageously, the present invention contemplates an assembly which will compensate for differences in individual ball sizes, compensate for wear, provides a smooth chatter free movement and may be manufactured at a relatively inexpensive cost. Cost savings are accrued by the use of a lower grade precision ball in the device.

The present invention contemplates a bearing having a movable member and a housing. A group of tubular members parallel to each other are disposed at a distance from each other and have a plurality of ball bearings therebetween. The bearings are confined within suitable retainers and are disposed within the group of tubular members which form a track surface for the balls and together with the balls support the slide within the housing.

In the preferred embodiment a pair of vertically spaced longitudinally extending tubular members are horizontally aligned with a second pair of vertically spaced longitudinally extending tubular members. Each pair of tubular members are disposed at a distance from their companion pair of tubular members equal to the distance between each of the members in a pair. Generally, a second bearing assembly is provided on the opposite side of the slide member and between the slide member and the housing. The second bearing assembly is of a conventionl type i.e. having a plurality of balls disposed in a suitable retainer and in contact with races formed in the slide and housing members. Since the compensation for change in ball size is taken care of by the tubular members along one edge it is desirable to use the higher precision bearings along the other side for alignment purposes.

The invention will now be described in connection with the accompanying drawings; in which, FIG. 1 is an exploded perspective view of a bearing assembly according to the invention;

Figure 1:
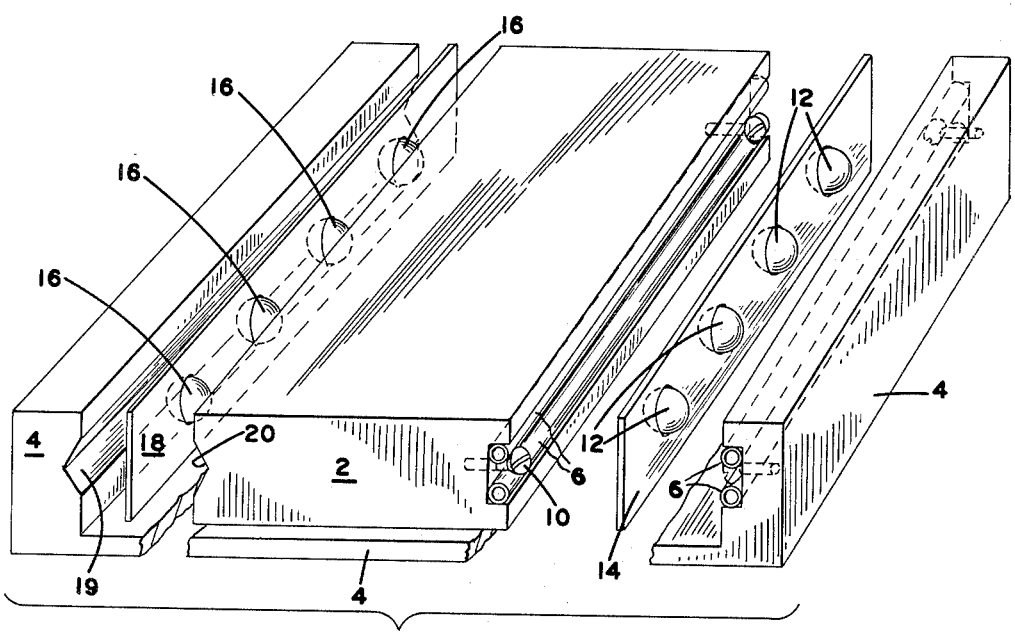
Figure 2:
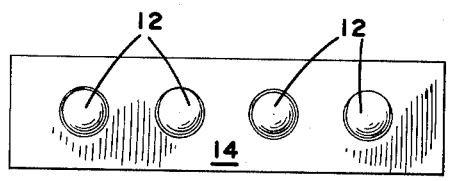
FIG. 2 is a side elevational view illustrating the ball and retainer assembly.
Figure 3:
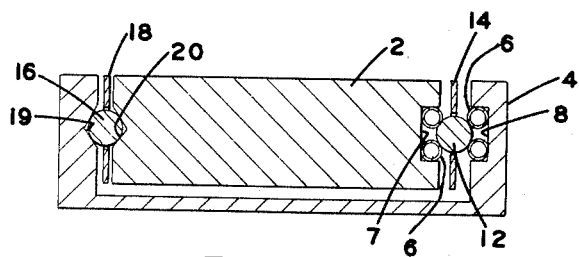
FIG. 3 is a cross sectional view of the bearing assembly shown in FIG. 1.

A rectilinear bearing assembly according to the present invention comprises a slide 2 which is disposed within a housing 4. The slide 2 is adapted to reciprocate in a horizontal plane. A group of longitudinally extending resilient tubular members 6 are disposed at a distance from each other and held within recesses 7 and 8 by screws 10. The recesses 7 and 8 are formed in an inner upright side of the housing 4 and the upright side of the slide 2 respectively. The recesses 7 and 8 are slightly shallower than the diameter of the members 6.

In the preferred embodiment there are two pairs of longitudinally extending members 6. A first pair of the members 6 are disposed at a distance from their companion pair equal to the distance between each of the members in the pair. The tubular members 6 of each pair are horizontally aligned and vertically spaced.

A plurality of ball bearings 12 are disposed between the corresponding pairs of tubular members which act as trackways for the balls, and the screws 10 limit the run of the balls to thereby limit the rectilinear movement of the slide 2. The bearings are confined within a retainer 14 and act together with the tubular members 6 to support the slide within the housing.

Generally standard manufacturing tolerances may be maintained in forming the recesses 7 and 8 since the tubular member 6 acts as the race or trackway for the balls 12. In many cases it is desirable to form the housing 4 as two separate parts and to incorporate means for pre-loading the bearing assembly. Manufacturing the housing in two parts also reduces the tolerance requirement, since shims may be used to align the tubular members.

The tubular members 6 tend to facilitate pre-loading since they compensate for irregularities in ball diameters.

A second set of balls 16 are spaced apart and confined within a retainer 18. The second set of balls 16 are disposed on the opposite side of the slide 2 between the slide 2 and the housing 4. The second bearing assembly is of conventional type, that is, the plurality of balls are in direct contact with a pair of races 19 and 20. The races are formed in an inner upright side of the housing 4 and the adjacent side of the slide 2 respectively.

The tubular members 6 compensate for changes in diameter of the balls 12. Changes in the diameter of the balls 16 will also be compensated for by the tubular members 6. In some cases it has been found desirable to use precision ball bearings and a conventional race along one side of the bearing assembly for alignment purposes.

Figure 4:
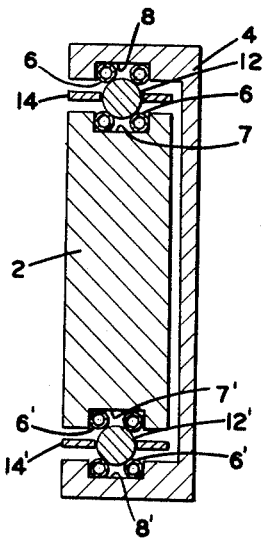
FIG. 4 is a cross sectional view of a second embodiment of the invention.

FIG. 4 illustrates a second embodiment of the invention wherein a second set of tubular members are incorporated on the opposite side of the slide 6. In the latter arrangement lower grade precision balls would be used with a possible loss in accuracy. Similarly, the second set of tubular members will compensate for slight deviations in parallelism of the recesses on opposite sides of the slide or housing.

A second group of longitudinally extending tubular members 6' are disposed at a distance from each other and held within recesses 7' and 8'. The recesses 7' and 8' are formed in an inner side of the housing 4 and the outer side of the slide 2 respectively. A first pair of the members 6' are disposed at a distance from their companion pair equal to the distance between each of the members in the pair.

A plurality of ball bearings 12' are disposed between the corresponding pairs of tubular members whereby the tubular members act as races or trackways for the balls. The bearings are confined within a retainer 14' and act together with the tubular members 6' to support the slide in the housing.

In the present invention a relatively large preload may be used without having a detrimental effect on the smooth movement of the slide. In a conventional bearing a relatively large preload will cause interference between the minor irregularities in the balls and rods resulting in comparatively large changes in the force required to move the slide.

Although the invention has been described more particularly with respect to a presently preferred embodiment, it will be understood that the illustrated form may be modified and embodied in different forms, such as radial bearings, without departing from the spirit or scope of the appended claims.

What is claimed is:
1. A bearing assembly including a housing and a slide disposed within said housing, two pairs of vertically spaced longitudinally extending resilient tubular members, a first of said pairs horizontally aligned with a second of said pairs, said pairs disposed between said slide and said housing and forming longitudinally extending trackways, a plurality of balls, a retainer for confining said balls in spaced relation to each other and in rolling contact with said trackways, and means limiting the movement of said slide, said balls, said trackways forming lateral and vertical supports between said housing and said slide and said tubular members so constructed and arranged that the resiliency of said tubular members compensates to a high degree for relatively small inconsistencies in the diameter of said balls.

2. A rectilinear bearing assembly including a housing and a slide disposed within said housing, two pairs of parallel horizontally displaced resilient tubular members mounted in substantially confronting relation, said first pair fixed to said slide and said second pair fixed to said housing, each pair of said tubular members disposed one above the other in substantially parallel spaced relation to thereby define parallel trackways, and a plurality of balls and a retainer for confining said balls in spaced relation to each other and in rolling contact with said trackways, said balls and said trackways forming lateral and vertical supports between said housing and said slide, and said tubular members so constructed and arranged that the resiliency of said tubular members compensates to a high degree for relatively small inconsistencies in the diameter of said balls.

3. A rectilinear bearing assembly according to claim 2; in which, a second set of two pairs of parallel tubular members are mounted in substantially confronting relationship between a second side of the slide and the housing, a first pair of said second set fixed to said second side of said slide and a second pair of said second set fixed to a confronting portion of said housing, each pair of said second set of tubular members horizontally disposed one above the other in substantially parallel relation to thereby define a second set of parallel trackways, a second retainer and a second set of balls disposed between the second set of parallel trackways and confined in spaced relation by said second retainer.

References Cited in the file of this patent
UNITED STATES PATENTS

| | | |
|---|---|---|
| 2,028,718 | Heine | Jan. 21, 1936 |
| 2,672,378 | McVey | Mar. 16, 1954 |
| 2,722,917 | Geller | Nov. 8, 1955 |
| 2,917,351 | Franke | Dec. 15, 1959 |
| 3,030,158 | Pohler | Apr. 17, 1962 |
| 3,097,895 | Matt | July 16, 1963 |

UNITED STATES PATENT OFFICE
CERTIFICATE OF CORRECTION

Patent No. 3,145,065                        August 18, 1964

Edward J. Cator

It is hereby certified that error appears in the above numbered patent requiring correction and that the said Letters Patent should read as corrected below.

Column 4, line 17, for "displaced" read -- disposed --.

Signed and sealed this 22nd day of December 1964.

(SEAL)
Attest:

ERNEST W. SWIDER                              EDWARD J. BRENNER
Attesting Officer                                 Commissioner of Patents